E. F. CARLSEN.
SHAFT COUPLING.
APPLICATION FILED APR. 12, 1920.

1,378,091.

Patented May 17, 1921.

Einar F. Carlsen, INVENTOR.

BY

ATTORNEYS.

UNITED STATES PATENT OFFICE.

EINAR F. CARLSEN, OF CHICAGO, ILLINOIS.

SHAFT-COUPLING.

1,378,091. Specification of Letters Patent. Patented May 17, 1921.

Application filed April 12, 1920. Serial No. 373,313.

*To all whom it may concern:*

Be it known that I, EINAR F. CARLSEN, a citizen of the United States, residing at Chicago, in the county of Cook and State of Illinois, have invented new and useful Improvements in Shaft-Couplings, of which the following is a specification.

This invention relates to devices for coupling the proximal ends of two sections of shafting, and its object is to provide a novel and improved device of this kind which is positive and effective in coupling the shaft sections, and which is also simple in construction, and readily applied, as well as loosened to disconnect the shaft sections.

The object stated is attained by means of a combination and arrangement of parts to be hereinafter described and claimed, and in order that the same may be better understood, reference is had to the accompanying drawing forming a part of this specification.

Figure 1:
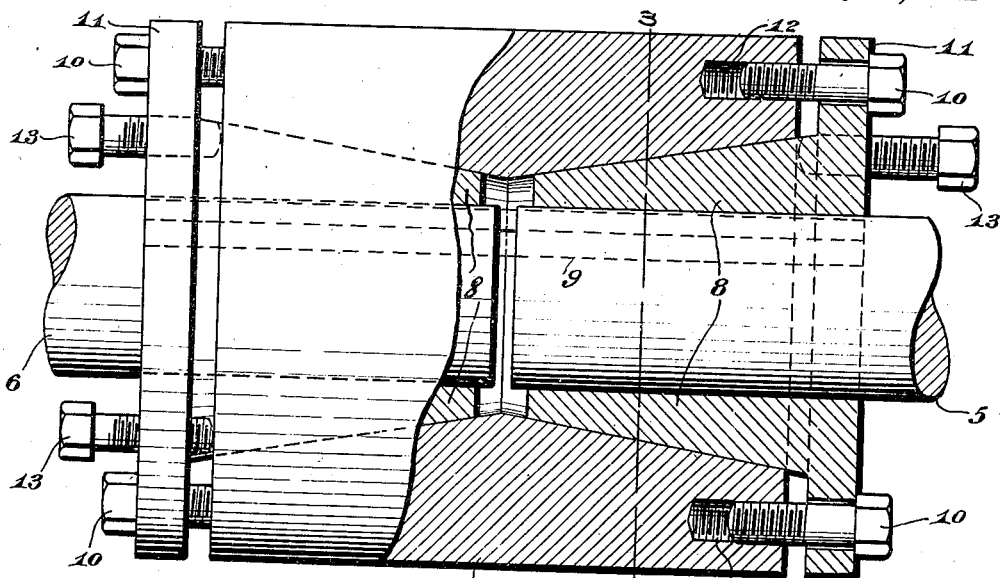
Figure 1 is an elevation of the coupling, partly in section.
Figure 3:
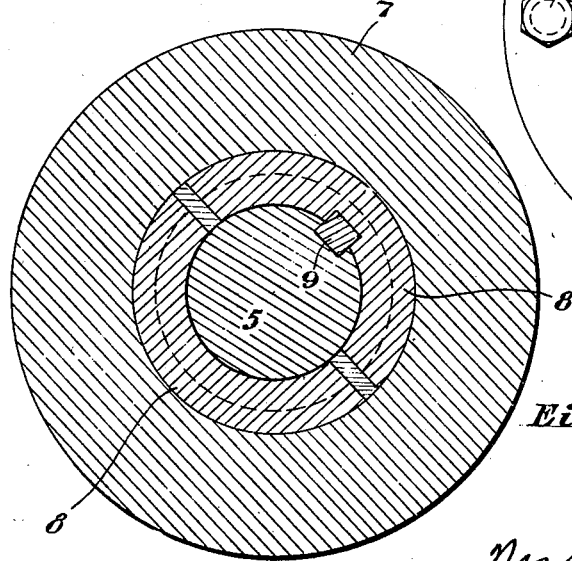
Fig. 3 is a cross section on the line 3—3 of Fig. 1.
Figure 2:
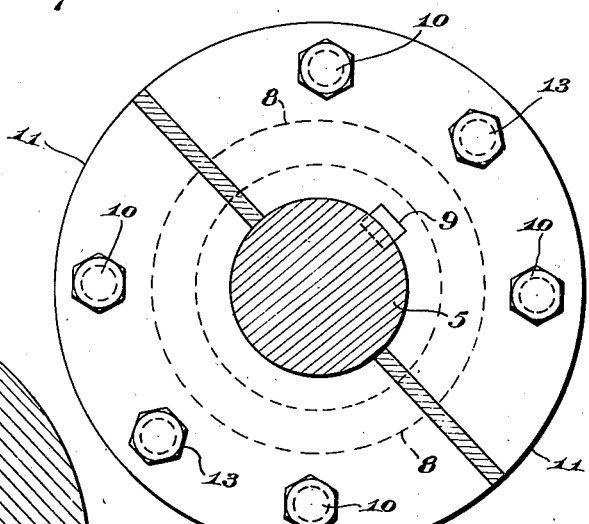
Fig. 2 is an end view.

In the drawing, 5 and 6 denote fragments of two alined shaft sections coupled together by the device which is the subject matter of the present application for patent. The coupling device consists of a sleeve 7 which is cylindrical externally, but has the internal form of two truncated cones with their narrow bases toward the center. In the sleeve 7 are placed two pairs of shaft engaging jaws 8, one pair for each shaft section. The inner surfaces of the jaws are made to fit the shaft sections, whereas the outer surfaces are inclined to correspond to the oppositely inclined surfaces of the interior of the sleeve. It will therefore be seen that the members of the respective pairs of jaws are wedged in the sleeve and also forced toward each other to grip the shaft sections, when they are moved inwardly, whereby the shaft sections are securely coupled to turn as one.

The coupling is designed more particularly for shafting subjected to frequent reversals and great torsional strain, and in addition to the hereinbefore described frictional coupling means, the shaft sections 5 and 6 are also keyed together, as shown at 9. The portions of the jaws 8 fitting the keyed portions of the shaft sections are grooved to seat the keys.

The jaw members 8 are advanced into the sleeve 7 to grip the shaft sections 5 and 6, by tap bolts 10 passing through lateral flanges 11 on the outer ends of the jaw members facing the ends of the sleeve, said bolts screwing into the ends of the sleeve 7 as shown at 12.

To facilitate withdrawal of the jaw members 8 when it is desired to disconnect the shaft sections 5 and 6, set screws 13 are carried by the flanges 11 to abut at their inner ends against the ends of the sleeve 7. By turning these set screws in a direction to advance the same, the jaw members are backed out of the sleeve in an obvious manner.

The invention is not limited to coupling shaft sections, but may be applied to rods and other elements which are to be fastened together in alinement.

I claim:

1. A shaft coupling comprising a sleeve having oppositely inclined surfaces on the inside, shaft-gripping jaws seating in the sleeve and having their exterior surfaces inclined to correspond to the inclined surfaces of the sleeve, the outer ends of the jaws having lateral flanges facing the ends of the sleeves, bolts passing through the flanges and screwed into the sleeve ends, and set screws threaded through the flanges to engage the sleeve ends.

2. A shaft coupling comprising in combination with alined shaft sections, a key connecting the shaft sections, a sleeve having oppositely inclined surfaces on the inside, shaft-gripping jaws seating in the sleeve and having their exterior surfaces inclined to correspond to the inclined surfaces of the sleeve, the outer ends of the jaws having lateral flanges facing the ends of the sleeve, and bolts passing through the flanges and screwed into the sleeve ends.

In testimony whereof I affix my signature.

EINAR F. CARLSEN.